United States Patent [19]

Kountz et al.

[11] 4,269,261
[45] May 26, 1981

[54] MICROCOMPUTER CONTROL FOR SUPPLEMENTAL HEATING IN A HEAT PUMP

[75] Inventors: Kenneth J. Kountz, Hoffman Estates, Ill.; Kenneth W. Cooper, York, Pa.; Frederic H. Abendschein, Columbia, Pa.

[73] Assignee: Borg-Warner Corporation, Chicago, Ill.

[21] Appl. No.: 80,361

[22] Filed: Sep. 28, 1979

[51] Int. Cl.³ .............................................. F28B 29/00
[52] U.S. Cl. ......................................... 165/2; 62/160; 62/228; 165/12; 165/29; 237/2 B
[58] Field of Search ............................... 165/12, 29, 2; 62/228 B, 160; 237/2 B

[56] References Cited

U.S. PATENT DOCUMENTS

| 3,041,849 | 7/1962 | Harnish | 62/160 X |
| 3,214,931 | 11/1965 | Petraneb | 62/160 |
| 3,499,297 | 3/1970 | Ruff et al. | 62/228 B X |
| 4,148,436 | 4/1979 | Shaw | 62/160 X |

Primary Examiner—Albert W. Davis
Attorney, Agent, or Firm—Thomas B. Hunter

[57] ABSTRACT

An apparatus and method for controlling continuously and discretely the speed of a heat pump compressor as a function of load conditions to run at least up to 150% of its rate-speed when operated in the heating mode to provide initial supplemental heating prior to turning on of electric heaters. The speed of the indoor condenser fan is maintained at its full rated-speed. The operation of the apparatus is controlled by a microprocessor with a program to provide improved performance and minimize energy consumption.

9 Claims, 2 Drawing Figures

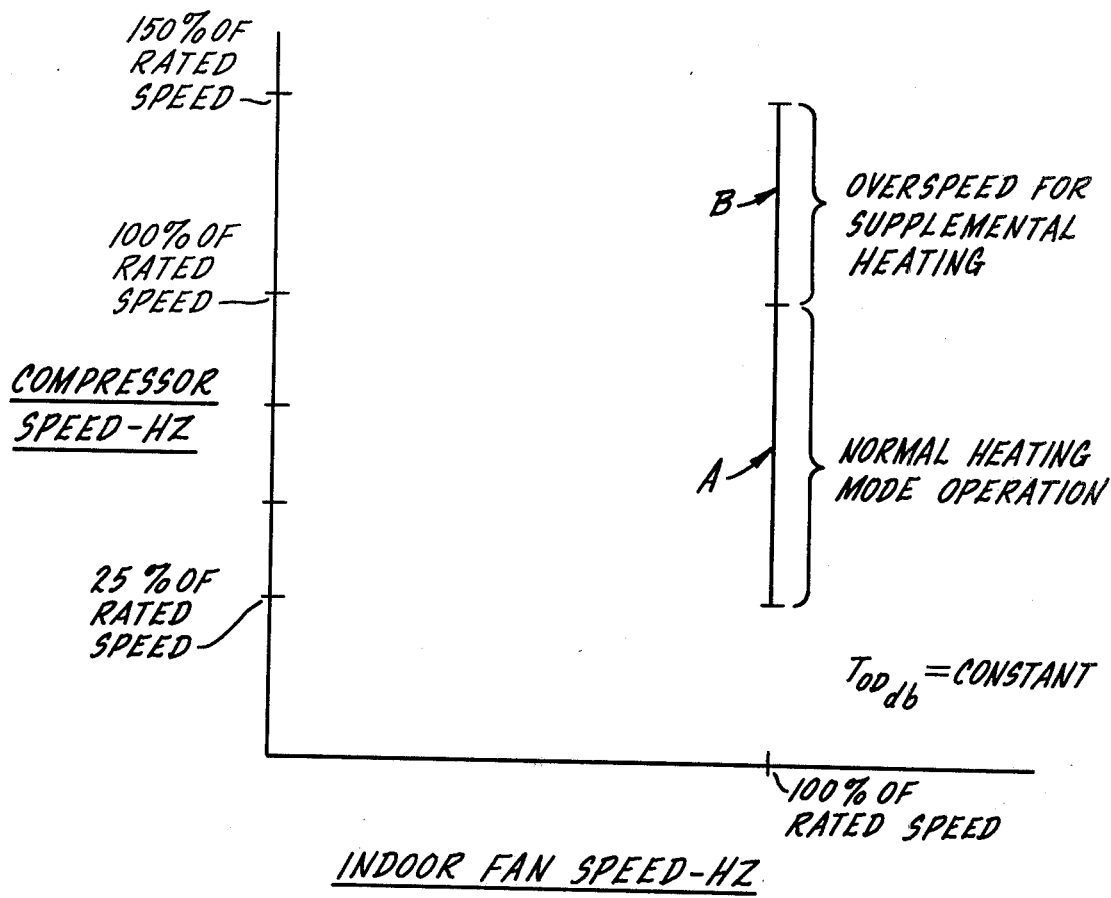

MICROCOMPUTER CONTROL FOR SUPPLEMENTAL HEATING IN A HEAT PUMP

CROSS-REFERENCE TO RELATED APPLICATIONS

Reference is made to the patent application entitled "Microcomputer Control for an Inverter-Driven Heat Pump," which was filed on the same day and in the names of the same inventors as this application and which was assigned to Borg-Warner Corporation, assignee of the present invention. The entire disclosure of the previously mentioned title is specifically incorporated herein by reference as if the same were repeated fully.

BACKGROUND OF THE INVENTION

This invention relates generally to heat pumps and refrigeration systems and more particularly, it relates to an apparatus and method for controlling continuously and discretely the speed of the compressor in response to load conditions while holding the speed of the indoor condenser fan motor at a constant full rated-speed when operating in the heating mode. The invention has particular applications in heat pumps for heating residential dwellings, small office buildings, mobile homes and the like.

It has been discovered that when a heat pump system is operated in the heating mode energy can best be conserved by varying the speed of the compressor in response to load conditions while maintaining the speed of the indoor condenser fan motor at its full rated-speed. If the heat pump cannot achieve the desired heating after the compressor speed has reached its full rated-speed, it has been found that the compressor can be designed to operate at speeds in excess of the rated-speed such as up to 150% of rated-speed or a 50% increase over rated-speed to supply additional heating prior to turning on of supplemental electric heaters. In this manner, considerable amounts of energy can be saved by maintaining the electric heaters in the off condition until it is necessary to turn them on to supply the desired heating.

After the compressor has been operated at such as 150% of rated-speed and the amount of heat is still insufficient, then a first stage of electric heat is turned on. If this first stage of heat is not adequate, second and third stages of electric heaters can be turned on additionally. The adding of the various stages of supplemental electric heaters is done progressively to achieve the desired amount of heating.

SUMMARY OF THE INVENTION

Accordingly, it is a general object of the present invention to provide a new and improved heat pump system which minimizes energy consumption.

It is an object of the present invention to provide an apparatus and method for use in a heat pump in the heating mode for controlling continuously and discretely the speed of the compressor as a function of load conditions while maintaining the speed of the indoor condenser fan at its full rated-speed.

It is another object of the present invention to provide an apparatus and method for use in a heat pump for controlling the speed of the compressor to run at least up to 150% of its rated-speed to provide initial supplemental heating.

It is still another object of the present invention to provide a heat pump system for adding sequentially at least three stages of supplemental electric heat after the compressor has been made to operate at a maximum speed such as 150% of rated-speed. Saving considerable amounts of energy is made possible by delaying the addition of supplemental electric heat by using the extra heat pumping capacity of the compressor operating above its rated-speed.

It is still yet another object of the present invention to provide an apparatus and method utilizing a microprocessor to provide a digitally controlled signal for digital regulation of the speed of the compressor, the speed of the indoor condenser fan motor being controlled by the microprocessor to run at its constant full rated-speed.

In accordance with these aims and objectives of the instant invention, there is provided a refrigeration system for conditioning a space which includes a closed refrigerant circuit consisting of a compressor, a condenser, an expansion device, and an evaporator connected respectively in series. When the system is being operated in the heating mode, the system has a first sensing means for measuring the temperature of the space to be conditioned to generate an electrical signal representative of the measured temperature. A thermostat is provided for setting or selecting the reference temperature of the space to be conditioned which produces a second electrical signal representative of the selected reference temperature. A second sensing means is provided for measuring the temperature of the outdoor atmosphere to generate a third electrical signal representative of the outdoor atmospheric temperature. A fan inverter is connected to a condenser fan motor for operation at its full rated-speed. A compressor inverter is connected to the compressor motor for controlling continuously and discretely the speed thereof between a range of 25% to at least 150% of its full rated-speed. A programmed control device in response to the measured temperature and reference temperature produces a digital signal for driving the compressor inverter. The control device is responsive to the second sensing means for causing the digital signal to increase when the outdoor temperature decreases below a predetermined set point so that the compressor inverter will drive the compressor motor up to at least 150% of its rated-speed to provide initial supplemental heating. A microprocessor having a program is operatively connected to the programmed control device for controlling the operation thereof to affect the measured temperature of the conditioned space.

BRIEF DESCRIPTION OF THE DRAWINGS

These and other objects and advantages of the present invention will be more fully apparent from the following detailed description when read in conjunction with the accompanied drawings wherein:

FIG. 2 is a graphical representation of compressor speeds in the heating mode to minimize energy consumption.

DETAILED DESCRIPTION OF THE PREFERRED EMBODIMENT

Figure 1:
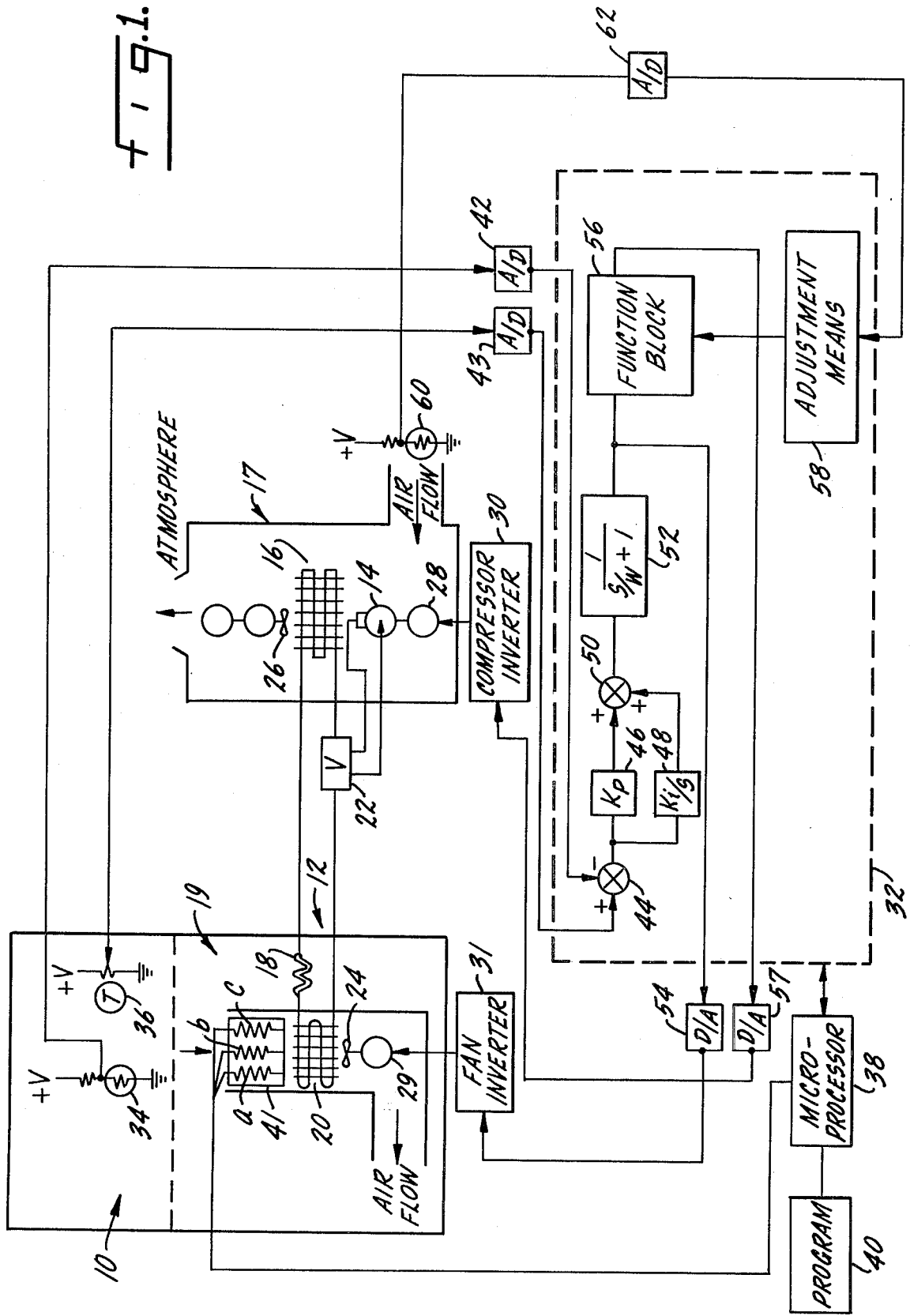
FIG. 1 is an electrical schematic block diagram of the heat pump and refrigeration system in accordance with the present invention.

As a background and to assist in the understanding of this invention, the other patent application mentioned above should be read in conjunction herewith. Referring now in detail to the drawings, there is shown in FIG. 1 a conditioned space or zone 10, which may be a room or rooms of a residential dwelling, that is provided with a heat pump and refrigeration system designated generally by reference 12. The system 12 consists of the conventional reversible heat-pump type which includes a compressor 14, a first heat exchanger 16 located normally outside and away from the conditioned space 10, an expansion device 18 such as a capillary tube, and a second heat exchanger 20 arranged in fluid communication with the zone 10 connected respectively in series to form a closed refrigerant circuit.

As can be seen, the compressor 14 and the first heat exchanger are housed in an outdoor unit 17 while the expansion device 18 and the second heat exchanger 20 are arranged within an indoor unit 19. During the heating cycle or mode of operation, the first heat exchanger is functioning as an evaporator and the second heat exchanger is operating as a condenser. The system may also includes a four-way reversing valve 22 for reversing the direction of refrigerant flow in the first and second heat exchangers so that the first heat exchanger can be operated as a condenser and the second heat exchanger can function as an evaporator in a cooling mode during the summer season. The manner of controlling the position of the valve 22 may be conventional and is not shown. For the purposes of discussion hereinafter, it is assumed that the system 12 is being operated in the heating mode with the heat exchangers 16, 20 being referred to as the evaporator and the condenser, respectively.

An indoor condenser fan 24 is positioned within the indoor unit 19 in the vicinity of the condenser 20 for circulating air therethrough and into the conditioned space 10. An outdoor evaporator fan 26 is also arranged in the outdoor unit 17 adjacent the evaporator 16 for circulating of the air therethrough and out into the atmosphere. The ducts necessary to supply the conditioned air to the space 10 to be heated and to remove the cooled air to the atmosphere have not been shown. The compressor 14 is driven by a variable-speed electric motor 28 whose speed is controlled by motor speed control means such as a compressor inverter 30. The inverter 30 may be of any conventional type well-known in the art and is utilized to provide an A-C voltage which is of a varying amplitude and frequency. It should be noted that the change in the speed of the motor 28 and thus the compressor speed are directly proportional to changes in the frequency within the standard speeds of operation. The indoor condenser fan 24 is also driven by a variable-speed electric motor 29 which is controlled by motor speed control means such as an indoor fan inverter 31.

The heat pump and refrigeration system 10 is provided with a programmed control means 32 which is responsive in part to the temperatures of the conditioned space 10 as measured continuously by temperature-measuring means consisting of a temperature-sensitive resistance such as thermistor 34. The details of the programmed control means 32 will be described more fully hereinafter. The control means 32 is also responsive to the desired variable temperature setting or reference temperature of the conditioned space to be heated as determined by thermostat 36 which has been shown schematically.

The system further includes a data processor designated generally as a microprocessor 38 having a program 40 for controlling the overall operation of the control means 32 in allowing readings of inputs from the thermistor 34 and the thermostat 36. It should be understood that while the microprocessor 38 has been shown, the present invention can be implemented with various solid-state electronic components such as discrete logic circuitry interconnected to perform the desired function. The microprocessor 38 illustrated in FIG. 1 may be of any one of a number of general purpose programmable digital computers which are commonly available at present. One such microcomputer suitable for application in this invention is a microprocessor sold by Texas Instruments designated as TMS 1100 which contains a read-only-memory (ROM), a random-access-memory (RAM) and an arithmetic logic unit (ALU) on a single semiconductor chip. Another processor which can be utilized in practicing the invention is a general purpose microcomputer sold by Digital Equipment Corporation referred to as PDP-11/03 system.

A plurality of supplemental electric heaters 41 are arranged above the condenser 20 within the indoor unit 19 to provide supplemental heating when needed. As can be seen, there are shown three stages of supplemental heaters designated respectively as 41a, 41b and 41c which are under the control of the microprocessor 38. In order to conserve and minimize energy consumption, the stages of electric heaters 41 are maintained in the off-condition until it is absolutely necessary to turn them on to supply the desired heating. Prior to turning on of the electric heaters 41, the speed of the compressor is made to run at least up to 150% of rated-speed, which will be described more fully below.

The thermistor 34 produces an electrical analog signal which is proportional and representative of the present actual measured dry bulb temperature in the conditioned space where the temperature is to be controlled. This analog signal is passed through an analog-to-digital (A/D) convertor 42 which provides a digital representation of the temperature measured by the thermistor 34 to the control means 32. The thermostat 36 provides also an electrical signal, either analog or digital, which is proportional to and representative of the reference temperature or desired temperature setting of the conditioned space 10. If an analog signal is produced from the thermostat 36, it is again sent through an A/D converter 43 to generate a digital representation of the dry bulb temperature setting on the thermostat.

The programmed control means includes a first summer 44 which adds algebraically the digital representation of the dry bulb set point and the continuously measured temperature to provide an error signal. This error signal is fed to a proportional gain amplifier 46 with a gain of Kp (hz/°F.) and an integrator 48 with a transfer function of $K_i/s$ (hz/sec−°F.). The digital output from the amplifier 46 and the integrater 48 are added by a second summer 50. The digital output of the summer 50 is sent to a digital filter 52 having a transfer function of $1/(s/w+1)$ wherein w has units of radians/sec. The digital output signal of the digital filter 52 is utilized to control the firing angle for the proper triggering or turning-on of the silicon-controlled rectifiers (SCR's) through a conventional bridge rectifier within the indoor condenser fan inverter means 31 via a digital-to-analog converter (D/A) or interface 54. The analog output from the D/A converter 54 controls the speed of the indoor condenser fan 24 via the inverter 31 and the fan motor 29. Under the control of the microprocessor 38, the analog signal from the converter 54 causes the indoor fan to maintain its speed at its full rated-speed during the heating mode. The output signal from the digital filter 52 is also sent to a functional block 56 for determination of the speed of the compressor 14. The operating speeds of the compressor are shown in detail in FIG. 2 and will be described below. The digital signal from the block 56 is passed through a D/A converter 57 to produce an analog signal for controlling the speed of the compressor 14 via the compressor inverter 30 and the electric motor 28.

The graphs of FIG. 2 show the operating speed of the compressor at a constant outdoor temperature. The curve A on FIG. 2 has been empirically determined, i.e., laboratory tests, to be the path of operation for minimizing energy consumption during the heating mode. In FIG. 2, the horizontal axis or abscissa represents the speed of the indoor condenser fan which is maintained at its maximum allowable speed or the full rated-speed (100%). The vertical axis or ordinate represents the speeds of the compressor between minimum speed and 150% of the full rated-speed. In this particular embodiment, the minimum speed of the compressor is approximately 25% of the rated-speed and the maximum speed is 150% of the full rated-speed. However, it should be understood to those skilled in the art that the maximum speed can be made to be any percentage in excess of the full rated-speed subject to mechanical design limitations in the compressor and the capabilities of the heat exchangers to take advantage of the additional refrigerant pumping capacity. Additionally, the minimum speed can be any percentage of the full rated-speed subject to compressor limitations.

As can be appreciated, the thermal load demand on the system will vary from time to time dependent upon a number of factors including variations in the indoor and outdoor temperatures. Thus, an adjustment means 58 is provided within the control means to allow an increase in the compressor speed along the curve B provided the outdoor temperature is below a predetermined temperature. A thermistor 60 is included to generate an electrical analog signal representative of the outdoor temperature and is sent through an A/D convertor 62 to the adjustment means 58. The output of the adjustment means 58 is fed as another input to the function block 56. It should be clear to those skilled in the art that the functional relationships set forth in the block 56 and the adjustment means 38 can be programmed into the microprocessor via the program 40 to step through a sequence of instructions to command these desired functions.

In operation, the program 40 controls the reading of inputs from the thermistor 34, thermostat 36 and the thermistor 60 via the respective A/D converters 42, 43 and 62 and provides for calculating of a digital signal for driving the A/D converter 57 to regulate the speed of the compressor. Under the control of the microprocessor 38, the control means maintains the speed of the indoor condenser fan motor 29 to run at its full rated-speed or 100% of speed as shown and described above with respect to FIG. 2. The proportional gain amplifier 46, the integrater 48 and the second summer 50 provide a control loop with lead compensation for minimizing the error signal from the first summer 44 at steady-state conditions and for cancelling the effect of the lag time in the measured dry bulb temperature reaching the desired condition in response to the change in the compressor speed. The digital filter 52 has been designed to remove any spurious noise in the measured temperature and/or in the operation of the A/D converters 42 and 43.

While the operation of the compressor in accordance with curve A in FIG. 2 realizes minimal energy consumption, it may not be sufficient to provide enough heat for the conditioned space such as due to the decreasing temperature in the outdoor atmosphere. In order to further conserve energy, it has been determined that it is better to operate the compressor motor continuously and discretely in the speed range of 25% to a predetermined value in excess of the rated-speed (100%) such as up to at least 150% of its full-rated speed or overspeed along the curve B prior to the initiation of supplemental electric heating. Typically, supplemental electric heaters are not necessary until the outdoor temperature drops below a predetermined temperature such as 50° F. This can be utilized as the set point for the adjustment means 58. When the outdoor temperature is above 50° F., the supplemental heaters 41 are prevented from turning on by the microprocessor 38. Below the set point temperature of 50° F., the digital signal from the functional block 56 will cause the inverter 30 to drive the compressor motor speed to a speed required to match the heating requirement, up to a maximum of at least 150% of its rated-speed, to provide initial supplemental heating via the control mean 32 prior to turning on of the electric heaters.

Once the outdoor temperature drops below this set point, the microprocessor allows the operation of one or more stages of electric heaters 41 provided the actual measured temperature of the conditioned space is below the reference temperature and the compressor motor is running at its selected maximum speed. The number of stages operating is controlled by the preselected value of the error signal. This can be programmed into the microprocessor 38 so as to cause a sequential turning on of the electric heaters 41a, 41b, and 41c to achieve the desired temperature in the conditioned space. It should be clearly understood by those skilled in the art that while three stages of electric heaters are shown any desired number of electric heaters could be utilized.

From the foregoing description of the heat pump and refrigeration system embodying the present invention, it can be seen that there is provided an apparatus and method for controlling continuously and discretely the speed of the compressor while maintaining the speed of the indoor condenser fan at a constant full rated-speed in the heating mode. The heat pump and refrigeration system is controlled in its overall operation by a microprocessor having a program to affect control of the measured temperature in a conditioned space. In order to minimize the consumption of energy, the compressor is operated at least up to 150% of its full rated-speed prior to the initiation of supplemental electric heaters.

While there has been illustrated and described what is considered at present to be a preferred embodiment of the present invention, it will be understood by those skilled in the art that various changes and modifications may be made and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out this invention but that the invention will include all embodiments falling within the scope of the appended claims.

What is claimed is:

1. A refrigeration system for conditioning a space and having a closed refrigerant circuit including a compressor, a condenser, an expansion device and an evaporator connected respectively in series, the system being operated in the heating mode, said system comprising:

first sensing means for measuring the actual temperature of a space to be conditioned and generating an electrical signal representative of the measured temperature;

means for setting a reference temperature of the space to be conditioned and generating a second electrical signal representative of the reference temperature;

second sensing means for measuring the temperature of the outdoor atmosphere and generating a third electrical signal representative of the outdoor atmospheric temperature;

condenser fan motor for driving a condenser fan at its full rated-speed to direct air into the conditioned space;

compressor motor for driving the compressor;

motor speed control means connectible to said compressor motor for controlling continuously and discretely the speed thereof between a predetermined minimum speed to a maximum predetermined value in excess of its full rated-speed or 100%;

programmed control means responsive to said first sensing means, said reference means, and said second sensing means for generating a digital signal to drive said motor speed control means;

said control means being further responsive to said second sensing means so that when the outdoor temperature is below a predetermined set point said digital signal allows said motor speed control means to drive the compressor motor to a speed in excess of its rated-speed, up to the maximum predetermined value, to provide initial supplemental heating; and data processor means having a program coupled to said control means for controlling the operation thereof to affect a measured temperature of the conditioned space.

2. A system as claimed in claim 1, further comprising at least three stages of electric heaters disposed above said condenser.

3. A system as claimed in claim 2, wherein said control means turns on each of the three stages of electric heaters in a sequential manner when the outdoor temperature is below the predetermined set point and in response to the difference between the measured temperature and the reference temperature to provide supplementing heating of a conditioned space after the speed of the compressor has reached the predetermined value in excess of its rated-speed.

4. A system as claimed in claim 1, wherein said programmer control means includes a first summer which compares the actual measured temperature with the reference temperature to provide an error signal.

5. A system as claimed in claim 4, wherein said control means further includes a second summer, a proportional gain amplifier and an integrator arranged in a closed loop and being responsive to said error signal so that the refrigeration system minimizes the steady-state error between the measured temperature and the reference temperature.

6. A system as claimed in claim 5, wherein said control means further includes a digital filter connected to said second summer to remove noise within the system.

7. A system as claimed in claim 1, wherein said data processor means comprises a microprocessor.

8. A system as claimed in claim 1, wherein each of said first and second sensing means comprises a thermistor.

9. A method for use in a heat pump and refrigeration system for conditioning a space having a closed refrigerant circuit including a compressor, a condenser, an expansion device, and an evaporator connected respectively in series, said method comprising the steps of:

sensing the actual temperature of a space to be conditioned to generate a signal representative of the measured temperature;

setting a reference temperature of the space to be conditioned to generate a second electrical signal representative of the reference temperature;

sensing the temperature of the outdoor atmosphere to generate a third electrical signal representative of the outdoor atmospheric temperature;

providing a condenser fan motor for driving a condenser fan at its full rated-speed to direct air into the conditoned space;

providing a compressor motor for driving the compressor;

connecting a motor speed control device to the compressor motor for controlling continuously and discretely the speed thereof between a predetermined minimum speed to a maximum predetermined value in excess of its full rated-speed or 100%;

generating a digital signal to drive the motor speed control device in response to the measured temperature, the reference temperature and the outdoor temperature;

allowing the digital signal when the outdoor temperature is below a predetermined set point to cause the motor speed control device to drive the compressor speed to a speed in excess of its rated-speed, up to the maximum predetermined value, to provide initial supplemental heating; and controlling through a microprocessor having a program the step of generating the digital signal to affect the measured temperature of the conditioned space.

* * * * *